Patented May 30, 1939

2,160,708

UNITED STATES PATENT OFFICE 2,160,708

ELECTRICAL APPARATUS

Roger Beauchamp Peacock, Knebworth, England, assignor to Imperial Chemical Industries Limited, a corporation of Great Britain No Drawing. Application January 2, 1936, Serial No. 57,323. In Great Britain January 23, 1935

3 Claims. (Cl. 106—15)

This invention relates to improvements in electrical apparatus, and more particularly to the dielectric and insulating accessories employed therein.

I have observed that the products obtained by the condensation of benzyl chloride by known processes possess electrical properties which are in many respects superior to those of the insulating media in general use, and consequently that such products are particularly suitable for use as dielectrics in the construction of condensers and as insulating parts in electrical apparatus generally.

Accordingly, my invention consists in electrical apparatus in which the dielectric or insulating medium comprises a condensation product of benzyl chloride.

Condensation products suitable for use in the invention may be prepared by heating benzyl chloride with a small proportion of a catalyst. Effective condensation catalysts include iron, aluminium and tin, and the oxides and chlorides of these metals. Preferably I use stannous chloride amounting to about 0.5 gram per litre to give a smooth and controllable reaction. With this catalyst the condensation is preferably carried out by heating the mass gradually from room temperature to 200° C. for a period of twelve hours and maintaining the temperature at about 200° C. for 130 hours. Hydrochloric acid is evolved during the heating, and at the end of the reaction the chlorine content of the product is below 1% and the melting point is between 75° C. and 110° C. depending upon the precise details of condensation.

In one form of my invention the condensed material forms the impregnant for the paper dielectric of electrical condensers made by winding alternate strips of metal foil and paper in the usual way. The wound condenser body is first dried under vacuum in the normal way, and is then immersed in the molten polymer, pressure being afterwards applied to complete the impregnation.

Condensed benzyl chloride can also be used as a sealing compound in joining boxes and the like, by melting it and pouring it into the box. Alternatively, the condensed material can be melted and cast into any required shape, or it may be compression moulded as a plastic in the usual way to form insulating parts in telephone circuits and the like. For such uses, it may be found desirable to incorporate a plasticizer such as chlorinated diphenyl, and/or mineral or organic fillers such as powdered mica and wood meal. Chlorinated diphenyl is a suitable plasticizer, inasmuch as it has itself good electrical properties, and its addition to condensed benzyl chloride does not impair the good qualities of the latter to as great an extent as does the addition of, e. g., tricresyl phosphate or dibutyl phthalate. The incorporation may be effected by merely mixing the components at about 150–200° C.

A further application of particular importance is the production of insulating parts for television apparatus, wherein, in addition to the very low surface conduction of the condensed product, its very low power factor constitutes a special advantage. In this connection I have found that a sample of the material had a power factor of 0.0009 at $10^6$ cycles/sec. and approximately 0.001 at $5 \times 10^7$ cycles/sec. and a surface resistivity of $3 \times 10^{14}$ ohms/cm$^2$ at 25° C. and 75% relative humidity.

I claim:

1. An insulating material for use in electrical equipment comprising essentially a benzyl chloride condensation product prepared by heating benzyl chloride for a prolonged period in the presence of stannous chloride as catalyst.

2. An insulating material for use in electrical equipment comprising essentially a benzyl chloride condensation product prepared by heating benzyl chloride for a prolonged period in the presence of stannous chloride as catalyst, together with chlorinated diphenyl.

3. An electrical insulating material for use in electrical equipment comprising essentially a benzyl chloride condensation product which is obtainable by gradually heating benzyl chloride in the presence of about 0.5 gram per liter of stannous chloride as catalyst from room temperature to about 200° C. for a period of about 12 hours and thereafter maintaining the resultant product at about 200° C. for approximately 130 hours, said condensation product having a chlorine content of less than 1% and a melting point of about 75 to 110° C.

ROGER BEAUCHAMP PEACOCK.